(12) United States Patent
Casselman

(10) Patent No.: US 6,178,494 B1
(45) Date of Patent: Jan. 23, 2001

(54) MODULAR, HYBRID PROCESSOR AND METHOD FOR PRODUCING A MODULAR, HYBRID PROCESSOR

(75) Inventor: Steve M. Casselman, Reseda, CA (US)

(73) Assignee: Virtual Computer Corporation, Reseda, CA (US)

(*) Notice: Under 35 U.S.C. 154(b), the term of this patent shall be extended for 0 days.

(21) Appl. No.: 08/717,752

(22) Filed: Sep. 23, 1996

(51) Int. Cl.[7] .............................. G06F 15/00; G06F 17/50
(52) U.S. Cl. ........................................ 712/37; 395/500.05
(58) Field of Search .................................... 364/488, 489, 364/490, 491; 395/921, 800.37, 500.05, 500.13; 712/357; 706/921

(56) References Cited

U.S. PATENT DOCUMENTS

| | | | |
|---|---|---|---|
| 4,638,442 | * | 1/1987 | Bryant et al. ........................ 364/489 |
| 4,908,772 | * | 3/1990 | Chi ........................................ 364/491 |
| 4,922,432 | * | 5/1990 | Kobayashi et al. ................... 364/490 |
| 4,990,996 | * | 2/1991 | Kumar et al. ......................... 257/786 |
| 5,111,413 | * | 5/1992 | Lazansky et al. .................... 364/578 |
| 5,195,130 | * | 3/1993 | Weiss et al. ....................... 379/93.19 |

OTHER PUBLICATIONS

Xilinx, The Programmable Logic Data Book, Xilinx Inc, 1993, pp. 2–1 to 2–2 and 2–178.*

* cited by examiner

Primary Examiner—John A. Follansbee
(74) Attorney, Agent, or Firm—Michaelson & Wallace

(57) ABSTRACT

A method is disclosed for integrating a field programmable gate array (FPGA) with a microprocessor to form a single, multi-chip or stacked, hybrid processor module. The method includes the identification and parallel routing of selected I/O pins of the FPGA and microprocessor. The method further includes the identification and routing of control pins of the FPGA and microprocessor to a controller, and, the establishment of an interface between the controller, the FPGA and the microprocessor in order to develop a processor module for coordinated processing of data utilizing both the FPGA and microprocessor resources.

3 Claims, 9 Drawing Sheets

MODULAR, HYBRID PROCESSOR AND METHOD FOR PRODUCING A MODULAR, HYBRID PROCESSOR

FIELD OF THE INVENTION

This invention relates generally to microprocessors, and more particularly to a modular, hybrid processor with a modularized controller and a field programmable gate array for combination with a selected microprocessor from a set of microprocessors.

BACKGROUND OF THE INVENTION

Recent improvements in performance capabilities of data processors have included increasing the clock speed or adding additional execution units.

Alternatively, field programmable gate arrays (FPGAs) have been considered for either augmenting or replacing microprocessors in order to expand the limitations posed by the arithmetic logic units. Wholesale replacement of microprocessors with FPGAs generally requires the entire recoding of operating systems. On the other hand, redesigning microprocessors to include FPGA-like architecture presents its own set of design errors.

Therefore, a need has been perceived for a quick and safe way to enhance the arithmetic performance of microprocessors and to implement algorithms within reconfigurable hardware.

SUMMARY OF THE INVENTION

In accordance with the present invention, a hybrid, modular processor package and method for developing a hybrid, modular data processing package from microprocessor and field programmable gate array (FPGA) technology combines a microprocessor, an FPGA, and a modular controller chip in order to obtain enhanced performance over that of the microprocessor. The combination of the microprocessor, FPGA, and controller chips is effected by identifying and selectively routing the non-control pins of the respective chips in parallel to the hybrid package pins and routing respective control pins of the microprocessor and FPGA through the controller pins. The controller chip emulates the behavior of the selected microprocessor bus interface and provides a set of services to the FPGA, such as configuration and memory management. By creating a standard interface to the FPGA and different microprocessor bus interfaces, a configuration code compatible family of computing devices can be created.

DETAILED DESCRIPTION OF THE PREFERRED EMBODIMENT

Figure 1:
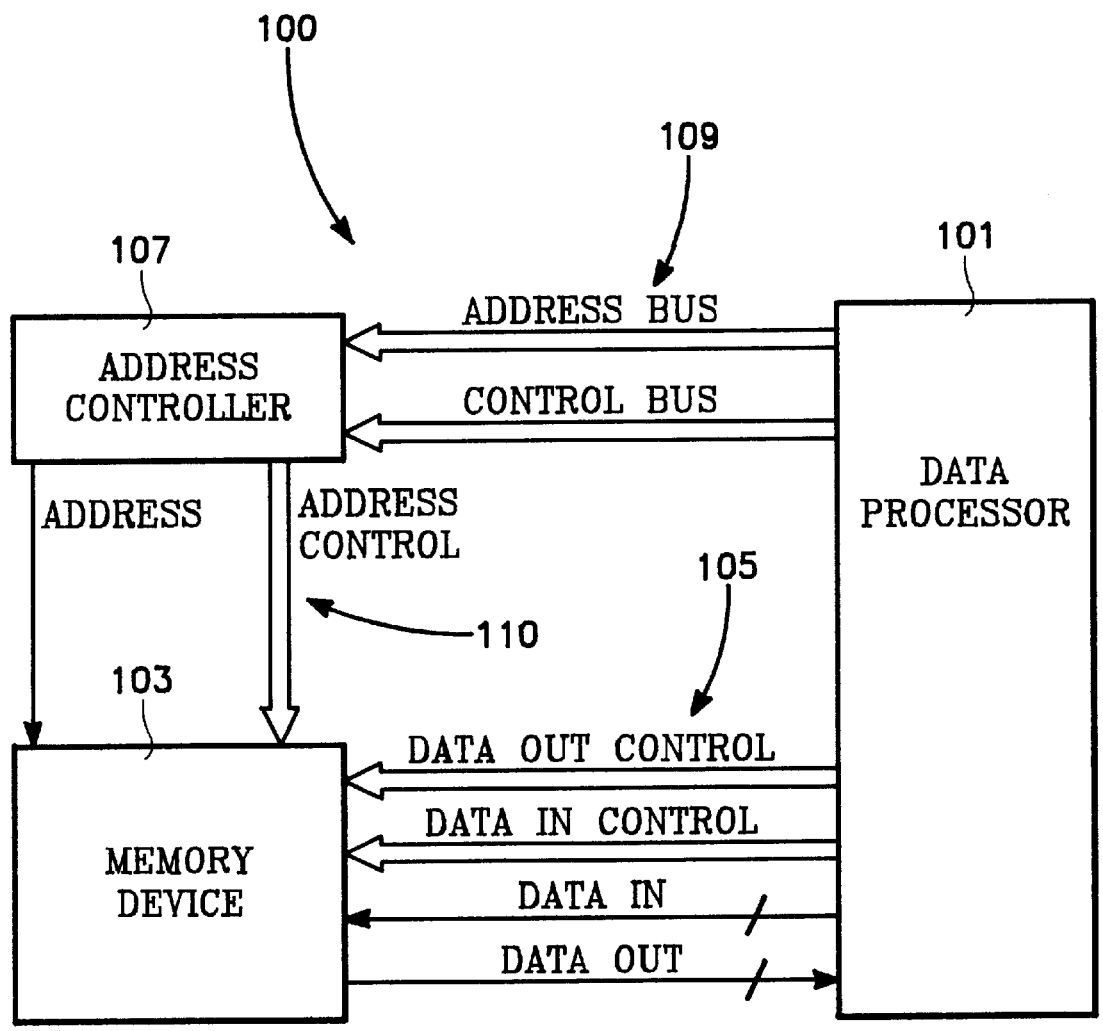
FIG. 1 is a block diagram representation of a computer system including a hybrid data processor.

With reference to FIG. 1, there is shown a block diagram of data processing system 100 which includes hybrid, modular data processor 101. Hybrid data processor 101 connects conventionally to a conventional memory unit 103 through data/control Input/Output (I/O) buses 105. Address controller 107 receives address and control instruction information from processor 101 over buses 109, and conventionally controls the addressing of data within memory device 103 by hybrid data processor 101 utilizing buses 110.

Figure 1A:
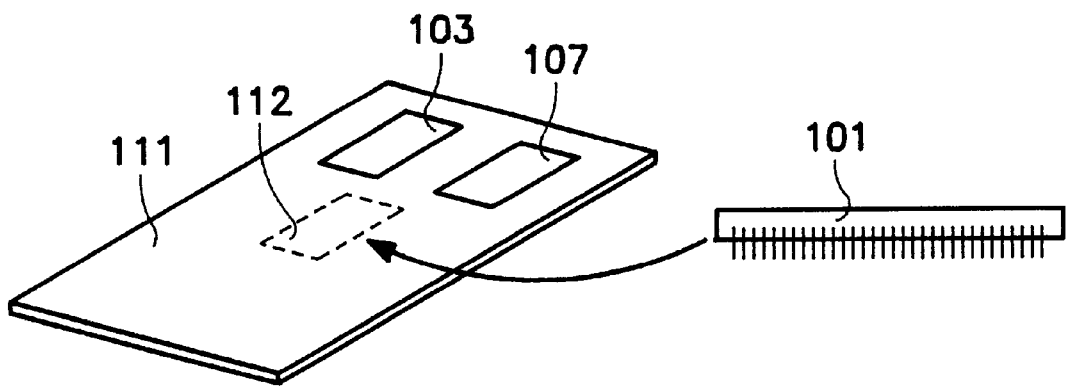
FIG. 1A is a block diagram representation of a computer circuit board including the computer system of FIG. 1.

Referring to FIG. 1A, processor 101 may be implemented on computer circuit board 111 having female socket 112 corresponding to the package pins of processor 101. The socket mates for each package pin may be connected to respective circuitry including memory device 103 and address controller 107 through buses as shown in FIG. 1. In turn, circuit board 111 may be implemented within a computer system, such as a personal computer, having an operating system stored in memory device 103 for establishing an operating environment for processor 101 and any attached peripheral elements. Additionally, application software may be stored in memory device 103 which is operable on the computer system by a user through I/O devices, such as a keyboard and a display panel. The application software may include code to support user-defined configurations of hybrid processor 101.

Figure 1B:
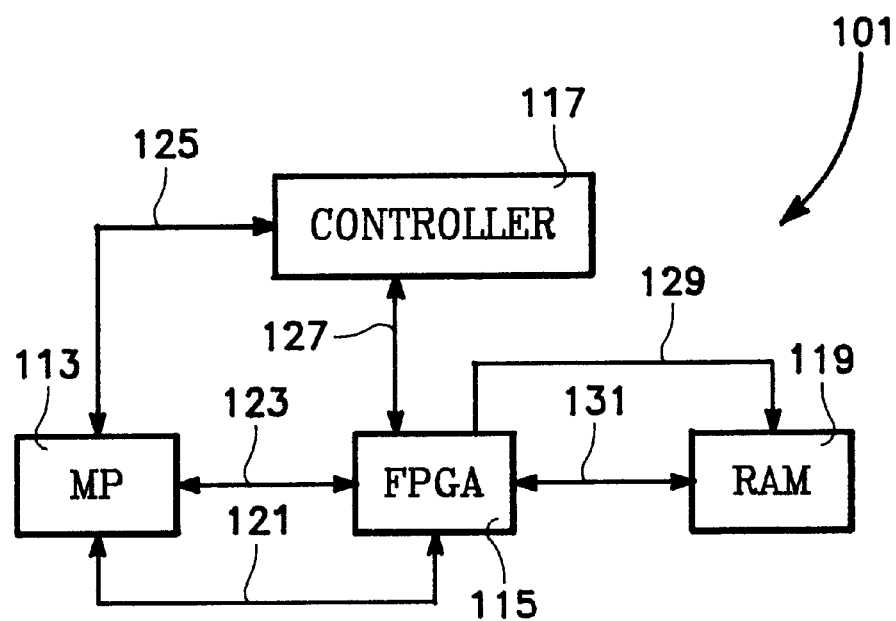
FIG. 1B is a block diagram representation of a hybrid data processor including a random access memory which shows the interconnection of the respective elemental units.

With reference to FIG. 1B, a block diagram of hybrid processor 101 is shown to include microprocessor (MP) 113. Microprocessor 113 may be selected from a set of conventional microprocessors which may include an Intel X86 or Pentium, AMD or Cyrix XX86, Motorola 80XXX, and similar microprocessor chips, and connected directly to field programmable gate array (FPGA) 115 through address and data buses 121, 123. FPGA 115 may comprise a conventional Xilinx XC6216 FPGA chip. Controller 117 controls communication between MP113 and FPGA115 through communication and timing interfaces 125, 127, which transfer respective control and input/output (I/O) signals between the respective elements. Random access memory 119 may optionally connect directly to FPGA 115 through address and data buses 129, 131.

Figure 1C:
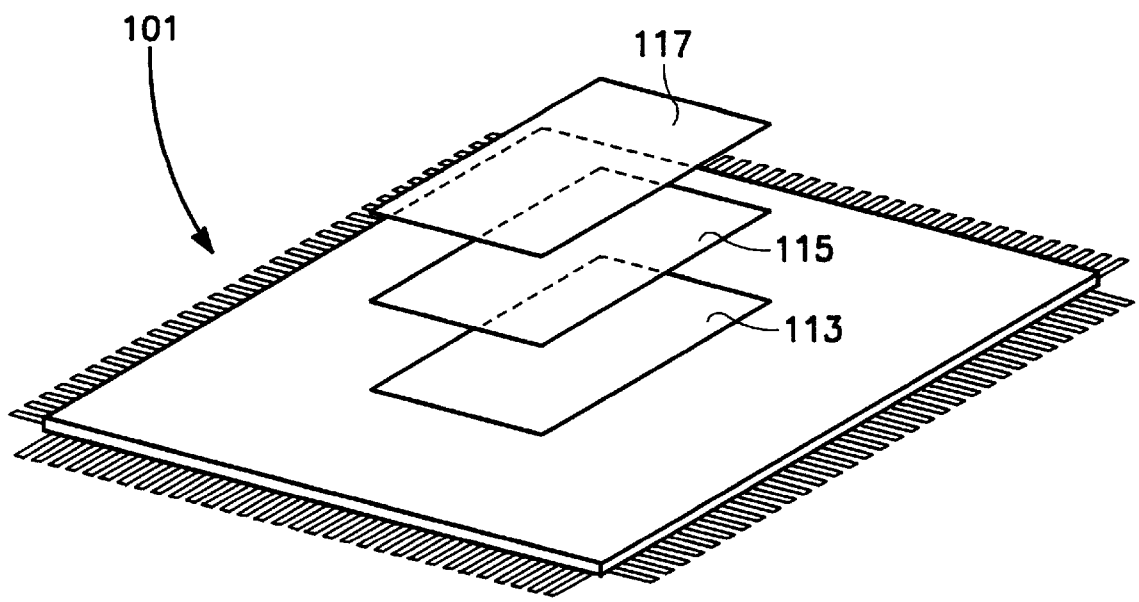
FIG. 1C is a block diagram representation of a hybrid data processor produced by stacking chips according to the present invention.
Figure 1D:
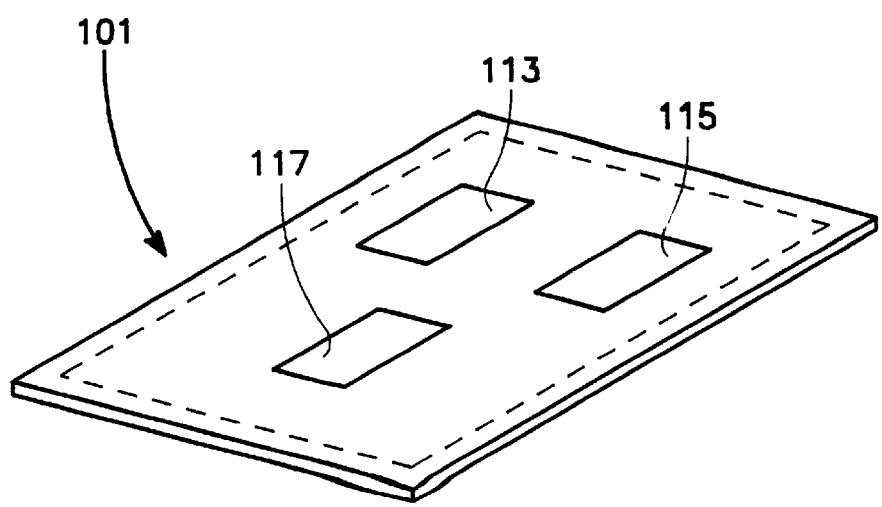
FIG. 1D is a block diagram representation of a hybrid data processor produced in a multi-chip module according to the present invention.

With reference to FIG. 1C, there is shown a block diagram representation of the preferred embodiment of hybrid data processor 101, which may be implemented as a single, stacked chip having multiple, connected levels with each level corresponding to a respective element. As shown, hybrid processor 101 comprises microprocessor (MP) 113 situated on a first level and pluggable into a second level, field programmable gate array (FPGA) 115 coupled to microprocessor 113, and controller unit 117 coupled to both, microprocessor 113 and FPGA 115. As a hybrid of a microprocessor and FPGA, processor 101 integrates FPGA and microprocessor technology to enhance algorithm execution performance. If the designed surface area for implementing data processor 101 onto a personal computer (PC) board is small, then a stacked design as shown in FIG. 1C may be preferred. However, if the designated surface area is large, then a multi-chip module (MCM) design may be used as shown in FIG. 1D. If desired, processor 101 may be implemented either with hardware, software, or both.

By stacking FPGA resources on microprocessor 113, FPGA 115 may be positioned at the center of the system as shown in FIG. 1C. With FPGA 115 positioned at the center of the system, FPGA 115 may access or utilize each of the microprocessor resources such as memory management coprocessors, bus controllers, and any other microprocessor accessible subsystem. If designed as a single chip, the multiple levels may be combined by integration of any or all of the respective components including microprocessor, FPGA, and controller elements. However, it may be more desirable to integrate the FPGA and controller elements 115, 117 onto a single modular chip, so that various microprocessors may be selected for use with the single modular chip.

Figure 2:
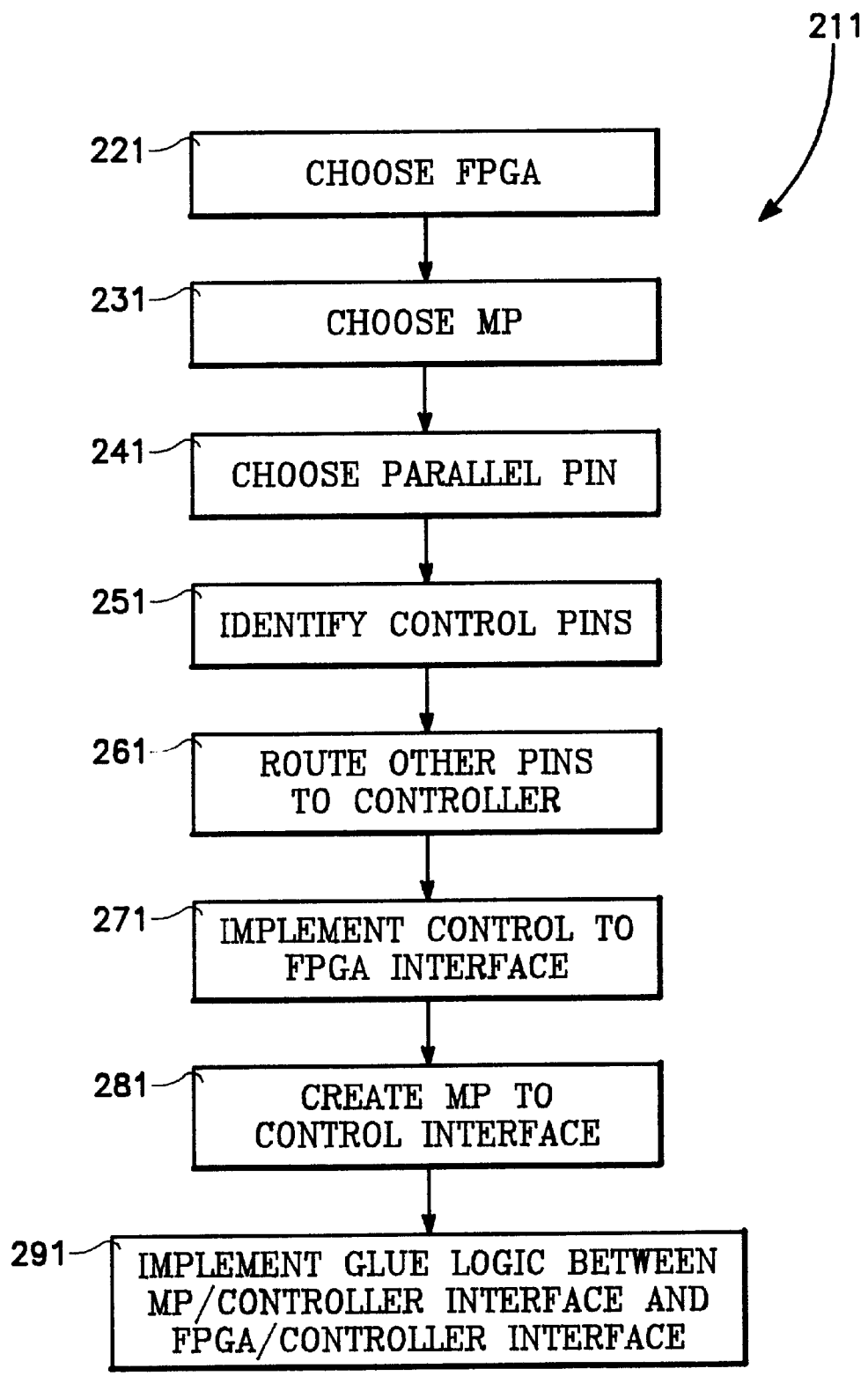
FIG. 2 is a flow diagram illustrating the method for producing a hybrid data processor according to the present invention.

Referring to FIG. 2, process 211 is shown in a flow chart representation to include a series of steps for producing hybrid processor 101. Process 211 may be implemented with a computer-aided design (CAD) program operated on a conventional personal computer, computer workstation, mainframe computer, or similar data processing system. The CAD program for implementing process 211 may be produced by utilizing conventional CAD programming packages appropriately modified according to the steps of process 211 herein described or may be written using conventional CAD programming techniques.

Process 211 initially identifies and selects FPGA 115 based upon pre-determined selection criteria, selection step 221. In the preferred embodiment, the selection criteria for FPGA 115 include rapid configurability (on the order of microseconds, preferably), fast access to the internal state of the registers in FPGA 115, and configuration space that is addressable as memory. The Xilinx XC40XX or XC62XX chips may be selected based upon these criteria. Other choices may include FPGAs produced by Atmels, ATT, Motorola, or Altera.

Microprocessor 113 and controller 117 are selected based upon pre-determined selection criteria, step 231. The selection criteria may often be determined by hardware design constraints or the desired operating system. The Intel '486 microprocessor has been selected in the prefered embodiment; however, microprocessor 113 may be selected from any of the commercially available x86 compatibles, Sparc, MIPS Power PC Alpha, or other such devices. Alternatively, microprocessor 113 may be chosen to be a digital signal processor, a memory device such as a random access memory, or other similar data processing device.

Microprocessor pin locations are identified which may be utilized in parallel with FPGA operations, step 241. Pursuant to Step 241, FPGA 115 (XC6216 chip) pins NØ, W31, WØ, SØ, N31, E31, S31 and EØ are routable in parallel. FPGA 115 also has a 32-bit data bus CD 31–CDØ and a 15-bit address bus along with CA14–CAØ (not shown). FPGA 115 pins OE, R/W, GCLK, G1, G2, GC1R, and Reset are Control Pins which are routable to controller 117 pursuant to step 251.

RAM 119 is a Static 256K memory (64K×32 bits), with sixteen address pins and 32 data pins directly connectable to associated pins on FPGA 115 as shown in FIG. 1B, and with CS, OE and R/W control pins routable through FPGA 115 to controller 117.

MP 113 includes control, data and address pins which may be identified during step 251 as by exemplar from Table 1, below. Those control pins identified in Table 1 with a '#' are active with a low input signal. The respective pin identities are provided by the manufacturer, for example, in the databook *Microprocessors*, Volume D, copyright Intel 1993, Pages 2–13 through 2–18. Pins D31–DØ may be routed in parallel with W31–WØ, CD 31–CDØ and PKD31–PKDØ, respectively. Similarly, pins D31, PKD31, W31 and CD31 may be wired together, and pins DØ, PKDØ, WØ and CDØ may be wired together.

Address lines A31–A4 may be connected in parallel A31, S31, PKA31 preferably are routed together A14, S14, CA14, PKA14 down to A4, S4, CA4, PKA4 preferably are routed together. Since many of the 486 pins are routed to the controller, additional FPGA 115 pins may be connected to 32-bit SRAM 119 pins including 32-bit data, 16-bit address, CS, OE, and R/W pins (referred to hereinafter as RD31–RDØ, RA 15–RAØ, RCS, ROE, RR/W).

RD31 and E31 through RDØ and EØ may be connected to FPGA 115 through buses 129, 131 as shown in FIG. 1B maintaining the data pins in the same most significant bit (MSB) to least significant bit (LSB) relationship as the D 31–DØ pins of MP 113. By connecting RAØ to N31, RA1–RA15 to N30–N16, RCS to N15, ROE to N14, and RR/W to N13, control of the internal RAM is provided to FPGA 115.

MP 113 (Intel 486 chip) has address lines A31–A2 and BE#0–BE#3 which should be made to appear linear to FPGA 115. In order for FPGA 115 to take control of processor 101, controller 117 should connect BE#O–BE#3 of MP 113 to the LSB's of FPGA 115 SØ–S3. To simplify the controller design, 32-bit words are utilized as reads and writes. Thus, whenever FPGA 115 controls MP 113, controller 117 drives BE#O–BE#3 to a logic level Ø.

For FPGA 115, some pins should be reserved for the hardware operating system (HOS) of processor 101.

During control pin identification step 251, control pins of microprocessor 113 and FPGA 115 are identified and routed to controller 117. Control pins of FPGA 115 that preferably are routed to controller 117 include chip selects, write enables, output enables, configuration mode, clock, reset, and any other pins that have global effect on the behavior of the FPGA. Control pins of microprocessor 113 that preferably are routed to controller 117 include power, reset, and any other pins that force microprocessor 113 into a state not under program control. Since the control signals of microprocessor 113 are generally sensed by external devices connected to the respective microprocessor pins, controller 117 (and chip 101) should mimic the microprocessor behavior with respect to those pins.

During step 261, all other pins of microprocessor 113 and FPGA 115 and their associated signals are routed through controller 117. Each of these pins require evaluation in order to determine sequencing considerations and implementation of associated logic circuitry and/or software in the manner as described above.

During step 271, an FPGA-to-Controller (FC) interface is created between FPGA 115 and controller 117. For a given FPGA 115, the FC interface preferably is standardized in order to allow a design including a hardware object code and FPGA configuration file to be utilized across different platforms.

One function of controller 117 is the configuration of FPGA 115. During or prior to the implementation of a configuration, the number of pins of the selected FPGA 115 and MP 113 are determined and compared by controller 117. Either FPGA 115 has a number of pins greater than or equal to microprocessor 113, or FPGA 115 has less pins than microprocessor 113. If FPGA 115 has enough pins to cover microprocessor 113 then FPGA 115 can configure portions of itself without microprocessor 113 intervention.

In the case where the number of FPGA pins is greater than or equal to the number of pins of microprocessor 113, each of the microprocessor pins preferably is routed to FPGA 115 with the exception of the control (identified in step 251), clock and possibly the JTAG test pins, which preferably are routed to controller 117. If the number of FPGA pins is much greater than those of microprocessor 113, then other resources may be connected to FPGA 115, such as RAM or digital signal processors (DSPs).

Through the FC interface, controller 117 controls reset and reconfiguration of FPGA 115, issuance of control signals to FPGA 115, reading from FPGA 115, and clock signals. Controller 117 is configured to reset FPGA 115 at selected times, such as when there is a system reset with the microprocessor reset pin in the active state or a non-maskable interrupt. Controller 117 also is configured to maintain the status of FPGA 115 and to allow readability by microprocessor 113 through associated controller status pins. The controller status pins may be utilized to provide configure, configure error, busy (as when FPGA 115 has been configured and is currently processing data or instructions), ready-to-be-configured, and sticky signals.

Controller 117 includes a clock control section which receives signals from any clock signals delivered to the package pins of hybrid processor 101 and delivers a system clock signal to microprocessor 113 and at least one global clock buffer on FPGA 115 nearest to an FPGA I/O buffer operable in parallel with microprocessor data and address pins. The clock control section generates a variable clock signal operable from 0 to 100 MHz and routes this clock to any other FPGA global clock buffer in order to establish single-step clocking control and simplified debugging of FPGA 115.

Controller 117 may reconfigure FPGA 115 by directly decoding some memory space in the system. Through the use of mode pins of FPGA 115 which are routed to controller 117 during step 251, FPGA 115 may be powered up in a non-active (slave) mode and wait. When control logic within microprocessor 113 determines to utilize FPGA 115, microprocessor 113 writes data to the configuration address which controller 117 directs to an FPGA configuration pin and toggles any related control pins of FPGA 115 (such as CCLK on Xilinx 4000 chips.)

During step 281, an interface is created between microprocessor 113 and controller 117 (MC interface) to enable coordinated configuration and control of FPGA 115. For instance, controller 117 may decode addresses or address space that do not conflict with any other part of the system address space. In order to avoid addressing conflicts, FPGA configuration and control sections are included within controller 117 which may be designed to emulate, rather than include, four thirty-two bit storage or thirty-two bit I/O locations. The emulated memory may be defined such that register '0' stores status and control read/write control read only status information; register '1' stores configuration data during a write operation which is read back during a read operation; register '2' stores variable clock control (Read/write) information; and, register '3' is reserved by the manufacturer and is utilized differently for each FPGA 115 and microprocessor 113 combination.

Finally, step 291 includes designing any additional logic circuitry and/or software between the microprocessor/controller and FPGA/controller interfaces to facilitate communication for selected interactions.

Figure 3:
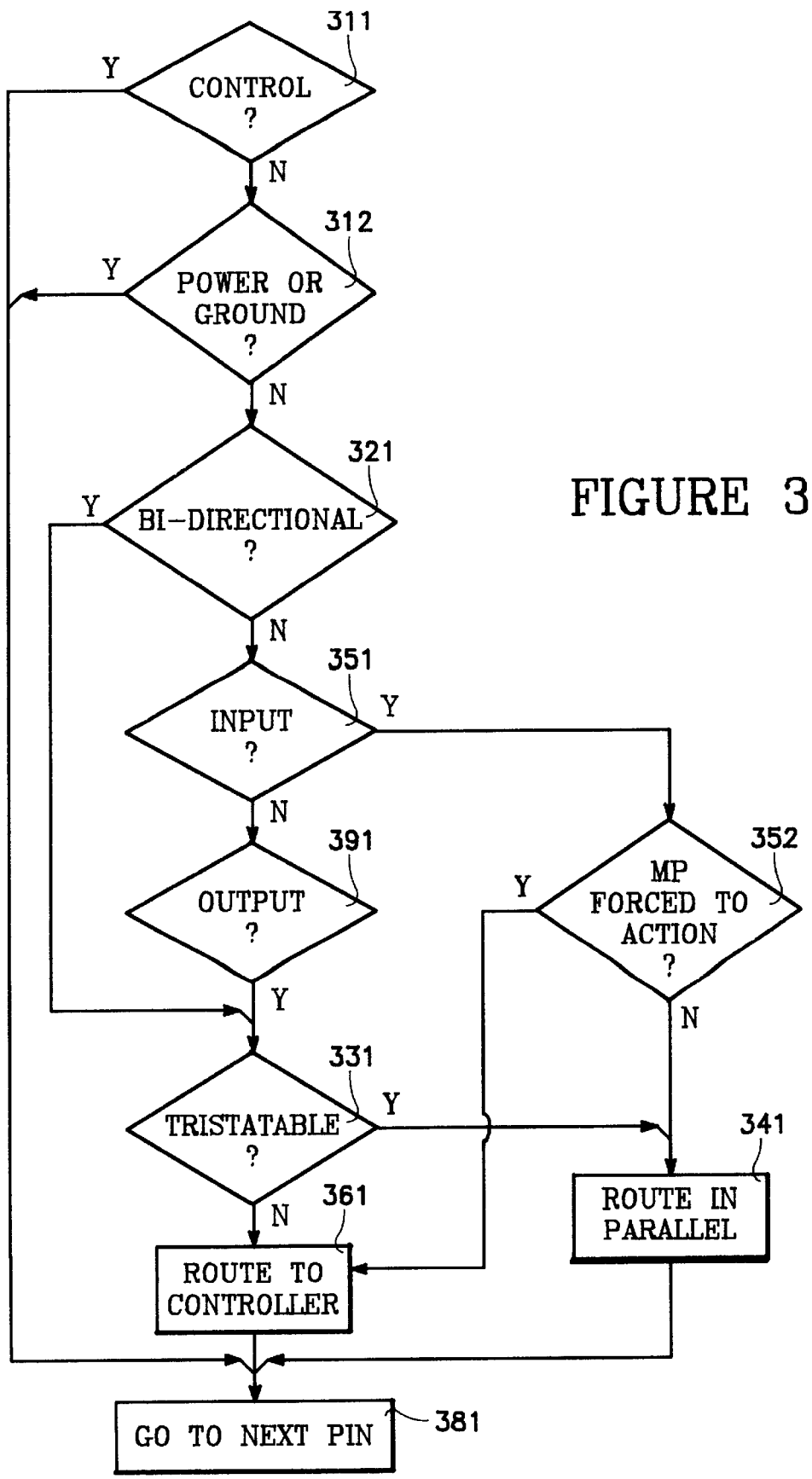
FIG. 3 is a flow diagram illustrating the sub-steps of the pin choosing, identifying, and routing steps as shown in FIG. 2.

Referring to FIG. 3, a flowchart of a preferred process for implementing identification step 241 is shown. Identification step 241 includes sub-steps wherein microprocessor pins are tested or evaluated according to whether the pins are control, power or ground pins (sub-steps 311, 312), bi-directional and tri-stated pins (sub-steps 321, 331), input pins which do not force a microprocessor action (sub-step 351, 352) or output pins which are tristatable (sub-steps 391, 331). Microprocessor control, power, or ground pins are neither routed in parallel nor to the controller (sub-steps 311, 312). Bi-directional and tri-stated pins (sub-steps 321, 331) can generally be run in parallel with FPGA operations and may therefore be routed in parallel (sub-step 341). For example, microprocessor pins for data I/O are generally bi-directional and can be run in parallel with FPGA 115 if the I/O pins can be tristated either by software control or through an external device. If the I/O pins cannot be tristated, then they must be connected to controller 117 for mixing and/or synchronizing with signals from and to FPGA 115 (sub-step 361). If a pin on the microprocessor is utilized for input only (sub-step 351) and does not cause microprocessor 113 to change condition (sub-step 352), then the input pin may be utilized directly in parallel with FPGA operations (sub-step 341). For example, a non-vectored interrupt signal causing a microprocessor to access an address and fetch an instruction is hardwired into the microprocessor and cannot be changed. Therefore, a non-vectored interrupt signal preferably is routed to controller 117 (sub-step 361) in order to provide control to FPGA 115 and to avoid potential conflict with transactions. If a microprocessor pin is utilized for output only (sub-step 391), the output pin is run to controller 117 (sub-step 361). For example, the address pins in some microprocessors are strictly used as output pins and represent system control signals which preferably are run to controller 117 (sub-step 361) in order to permit FPGA 115 to control data processor 101 and associated peripherals or connected devices. If microprocessor 113 has a coprocessor port, it will have coprocessor control signals which are outputs of the microprocessor and inputs to the coprocessor. If these microprocessor outputs are always driving, then they preferably are routed to controller 117 (sub-step 361). Controller 117 can then mix and/or synchronize these signals between microprocessor 113 and FPGA 115 and provide the FPGA direct access to the coprocessor.

Figure 4:
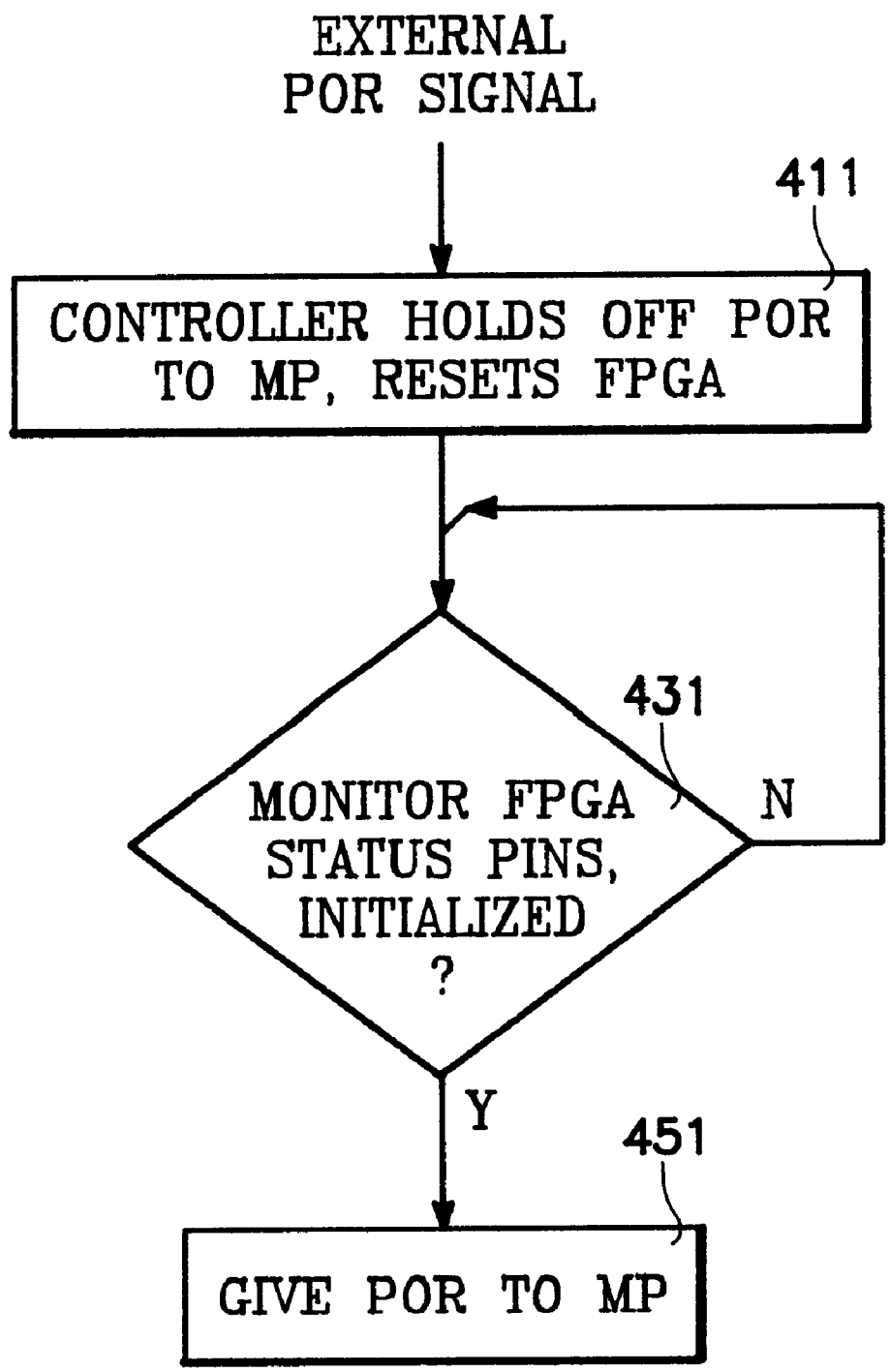
FIG. 4 is a flow diagram illustrating a method for operating the hybrid data processor during power-on reset according to the interface logic developed as shown in FIG. 2.

Referring to FIG. 4, a power-up sequence is illustrated. To initialize the power-up sequence of chip 101, a power-on reset (POR) signal, generated from an external system and directed to chip 101, may be passed directly to controller 117 rather than to microprocessor 113, (sub-step 411), by routing the POR pin of chip 101, either through logic circuitry and/or software. Upon receipt of the POR signal, controller 117 resets FPGA 115 and monitors the FPGA pin status to determine that FPGA 115 has been initialized, (sub-step 431). Once FPGA 115 has been initialized, the POR signal is delivered to microprocessor 113 from controller 117, (sub-step 451). In the case where FPGA 115 includes a random access memory (RAM) that replaces a system RAM, controller 117 may be required to generate its own POR signal and not decode FPGA address locations until FPGA 115 has been reset.

Figure 5A:
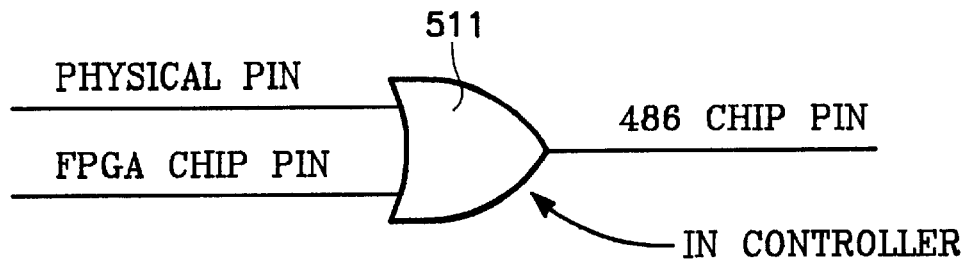
FIG. 5A is a diagram illustrating parallel routing in which the microprocessor HOLD pin is paired with an FPGA pin through a logic gate.
Figure 5B:
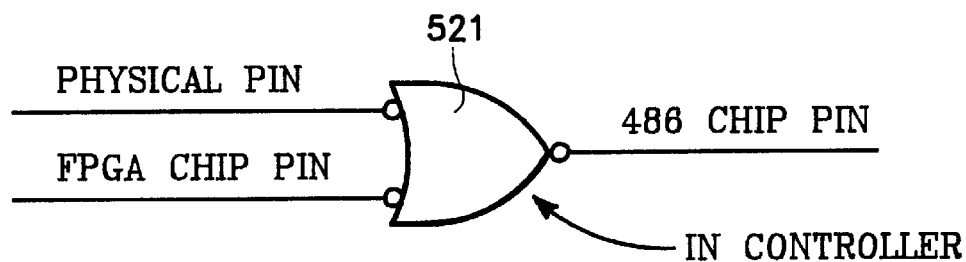
FIG. 5B is a diagram illustrating parallel routing in which the microprocessor FLUSH pin is paired with an FPGA pin through a logic gate.

In order to further coordinate control of processes within data processor 101, some pins utilized for receiving control input signals to microprocessor 113, such as HOLD or FLUSH, may be logically connected through controller 117 with an associated pin from FPGA 115. Exemplar circuits are shown in FIG. 5A, wherein the HOLD instruction signal directed to a HOLD pin on a processor, such as a '486 microprocessor, is defined to be an active high (or positive voltage) input signal and is input paired with a signal from an associated FPGA pin into logical OR gate 511, and in FIG. 5B, wherein a FLUSH instruction signal directed to a FLUSH pin on a processor, such as the '486 microprocessor, is defined as an active low (zero or negative voltage) input signal and is input paired with a signal from an associated FPGA pin into logical NOR gate 521. These exemplary, logically coupled circuits enable an external system or FPGA 115 to control activation of pre-determined functions on microprocessor 113. Pins, such as the HOLD or FLUSH pins, need only be coupled through controller 117 to the external system if the respective physical package pins of chip 101 are always driven by the external system; otherwise, the FPGA pin, and corresponding signal therefrom, may be routed in parallel with the external input signal.

Figure 5C:
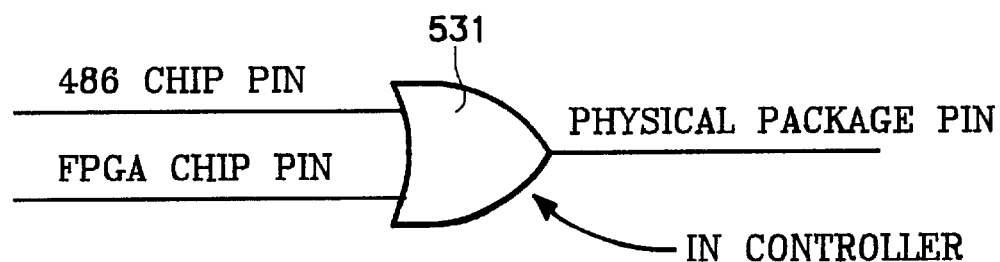
FIG. 5C is a diagram illustrating parallel routing in which the microprocessor BREQ pin is paired with an FPGA pin through a logic gate.
Figure 5D:
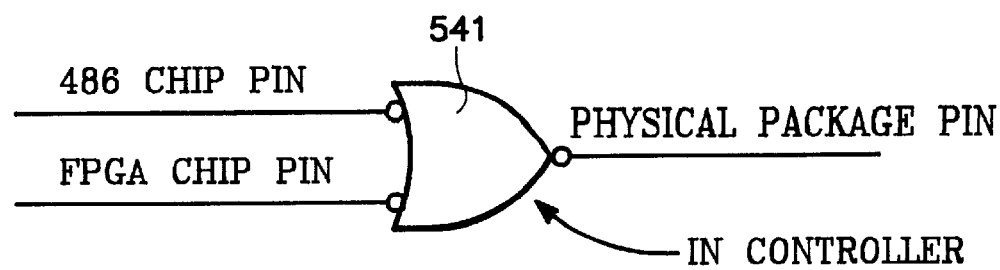
FIG. 5D is a diagram illustrating parallel routing in which the microprocessor PCHK# pin is paired with an FPGA pin through a logic gate.

Similarly, some microprocessor output signals may preferably be logically coupled within controller 117 if they are always being driven by microprocessor 113. An example circuit is shown in FIG. 5C, wherein the bus request (BREQ) control pin of microprocessor 113 is defined to be continuously driven, such as with a '486 microprocessor. The signal generated from microprocessor 113 and an associated signal generated from FPGA 115 are input paired into logical OR gate 531 implemented in controller 117 to provide a coordinated output signal to the associated BREQ control pin of data processor 101. A second example circuit is shown in FIG. 5D, wherein the PCHK# pin is defined to be continuously driven with an active low signal, such as from a '486 microprocessor. The signal generated from microprocessor 113 and an associated signal generated from FPGA 115 are input paired into logical NOR gate 541 implemented in controller 117 to provide a coordinated output signal to the associated PCHK# control pin of data processor 101.

For JTAG operation, TCK and TMS control pins associated with microprocessor 113, FPGA 115, and controller 117 can be routed in parallel to physical package pins (PPP) of data processor 101.

Figure 6:
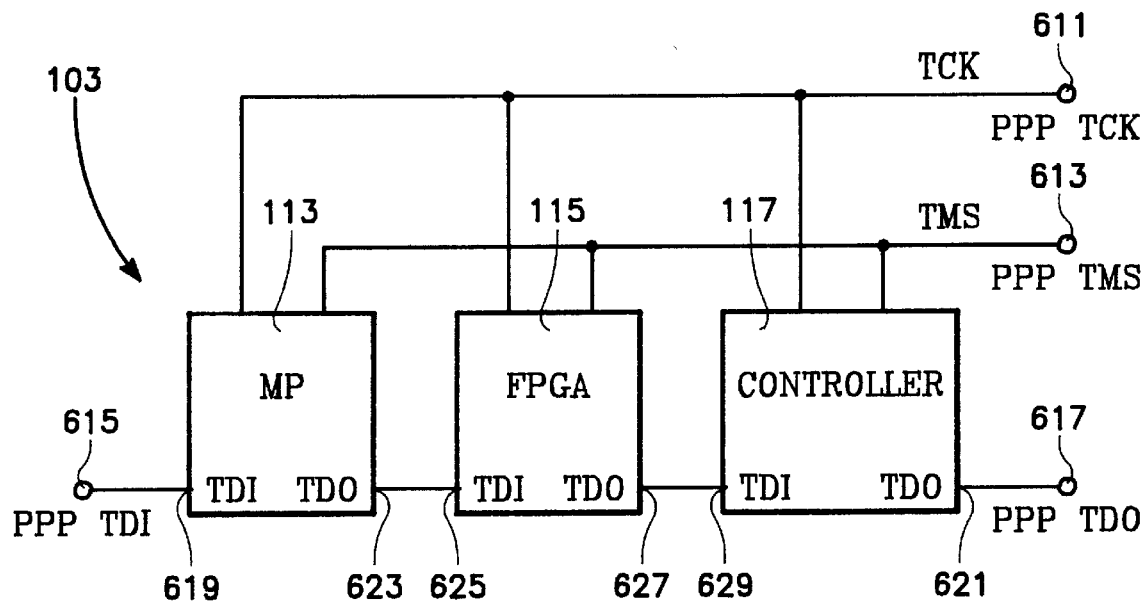
FIG. 6 is a block diagram representation of a hybrid data processor including a clock and glue logic according to the present invention.

Referring to FIG. 6, hybrid processor 101 is shown with parallel connected PPP TCK and TMS pins 611, 613. PPP TDI and TDO pins 615, 617 are shown respectively connecting to MP TDI and controller TDO pin locations 619, 621. MP TDO and FPGA TDI pin locations 623, 625 are connected. FPGA TDO and controller TDI pin locations 627, 629 are also connected.

Figure 7:
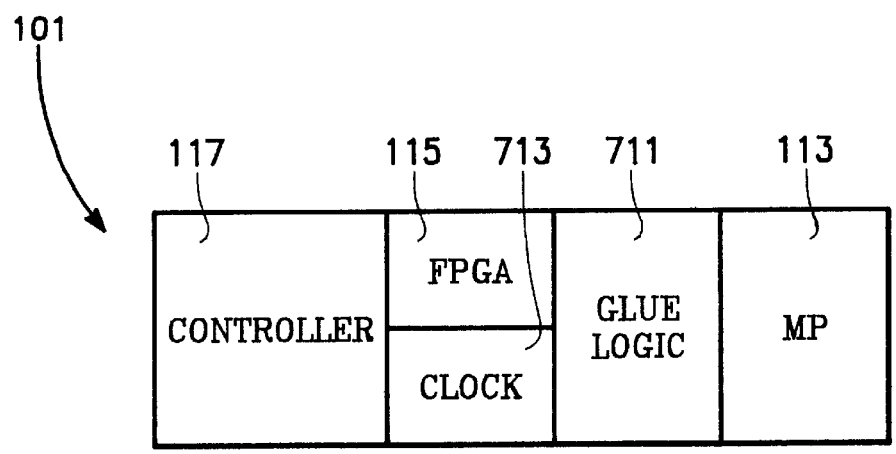
FIG. 7 is a block diagram representation of a hybrid data processor showing an input/output pinout according to the present invention.

Referring to FIG. 7, hybrid processor 101 is shown in a block diagram including glue logic 711 and clock 713. Glue logic 711 and clock 713 may be included onboard a single chip with hybrid processor 101 or may be located off-chip connecting to hybrid processor 101 through associated bus lines. Glue logic 711 may include software and/or hardware connecting MP 113 with FPGA 115 and controlled by controller 117 for integrating operations of MP 113 and FPGA 115.

Figure 8:
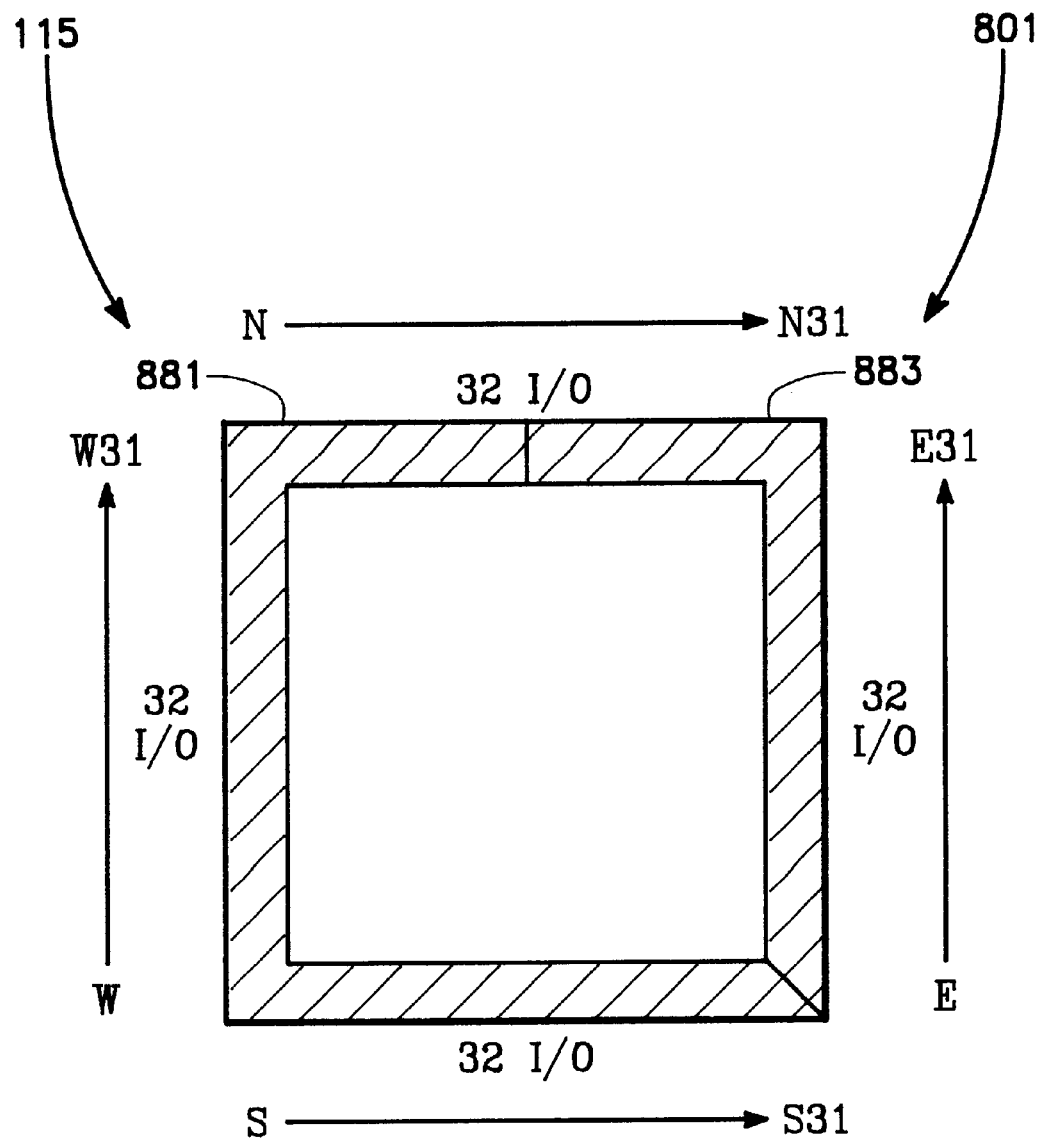
FIG. 8 is a pictorial diagram of the hybrid data processor illustrating pin configurations.

Referring to FIG. 8, a 32-bit Data and 32-bit Linear Address pin configuration 801 associated with the pin locations of FPGA 115 is shown. For a selected microprocessor, the pinout of FPGA 115 must be known in order to configure the FPGA-MP interface, to pass valid data to microprocessor 113 and to send data out to a valid address in memory 103. Additionally, the FPGA-MP interface should be connected to MP control pins for user requested burst mode reads or writes and microprocessor interrupt. Since many microprocessors pinouts are the same or compatible, an FPGA-MP interface developed for a given FPGA may be usable for a variety of MPs 113 with compatible pin configurations. Therefore, multiple microprocessors 113 and/or FPGAs 115 may be connected in the hybrid processor 101, such as is shown in FIG. 8.

With further reference to FIG. 8, master driver portion 881 of FPGA 115 connects to main Data bus 123 (shown in FIG. 1B) and the North-east corner 883 contains the FPGA-controller interface to controller chip 117. In the case where FPGA 115 operates as master driver 881, a slave-only or coprocessor is replaced by a slave driver.

Hereinafter, the Hardware driver (HD) is defined to mean the logic used to control interaction between the user logic functions (ULF) and the outside world. In both slave and master mode the memory of HD can remain the same. The master mode HD provides FPGA 115 with the ability to control the processor adding and control bus 109 and request data from the outside world. In master mode, FPGA 115 can reconfigure portions of itself. When FPGA 115 is operated in slave or coprocessor mode, MP 113 can deliver data to the user functions (programs) through the FPGA-MP interface or by requesting data while the FPGA 115 monitors and evaluates the data lines and address lines (south) to determine what data is intended for the user functions. Data cannot be written with this method and should be taken from an MP Port directly.

MP 113 (e.g., Intel 486) has 5 lines associated with parity DPØ–DP3 and PCHK#. To simplify the design, MP 113 will not check parity on reads this means that PCHK# can be routed directly to the 486 Physical Package pin PCHK# of processor 101. Parity must still be generated on writes from FPGA 115 when FPGA 115 is in master mode.

FPGA pins NØ–N12 are connected to controller 117. In each system these control pins and the logic that drives them will be different. FPGA pins NØ–N3 and DPØ–DP3 may be assigned so that even parity may be generated as described on page 2–87 of MICROPROCESSORS: Volume II, Intel 486 Microprocessors.

With continued reference to FIG. 8, the FPGA pinout is shown as may be utilized in a design configuration. In accordance with process 211, I/O pin NØ is next to W31 and WØ is next to SØ and N31 is next to E31 and S32 is next to EØ, each of which may connect in parallel. The XC6216 also has a 32-bit data bus connecting to data pins CD31–CD0, and a 15-bit address bus connecting to address pins CA14–CA0, and control pins CS, OE, R/W, GCLK, G1, G2, GC1R, and Reset. The attached RAM is A10 Static 256K organized as 64K by 32 bits 16 address lines A8 and 32 data lines A9. With CS, OE and R/W which will end up A7 user control.

Pins on the 486 identified during process 211 are listed in Table 1. The respective pin identities are found in the manufacturer provided in the databook Microprocessors, Volume D, copyright Intel 1993, Pages 2–13 through 2–18. For the rest of the description PKXXX will signify a physical package pin and XXX will be a pad on the IC. For example, PKUP# will mean the 486 package pin UP# which for 168 pin PGA is pin C11. Reference to UP# means the UP# pad on the 486 die.

In accordance with process 211, pins D31–DØ are respectively routed in parallel with pins W31–WØ, CD-31–CDØ and PKD31–PKDØ. For instance, pins D31, PKD31, W31 and CD31 may all be wired together as may DØ, PKDØ, WØ and CDØ. Address pins A31–A4 may respectively be tied in parallel with pins S31–S4, CA31–CA4, and PKA31–PKA4. For instance, pins A31, S31, CA31, and PKA31 may be tied together and pins A4, S4, CA4, and PKA4 may be tied together. Since many of the 486 pins must be routed to the controller, unused XC6216 user pins may be elected to be connected to a 32 bit SRAM in the same package which may include thirty-two data, sixteen address, and control CS, OE and R/W pins. The SRAM pins may be designated RD31–RDØ, RA 15–RAØ, RCS, ROE, RR/W, respectively. RD31 and E31 may be connected, as may be RDØ and EØ in order to connect the data line in the same MSB–LSB relationship as data pins D31–DØ of the MP. Additionally, pin RAØ may be connected to N31, RA1 may be connected to N30, and so forth such that RA15 may be connected to N16, RCS may be connected to N15, ROE may be connected to N14, and RR/W may be connected to N13 in order that the XC6216 port be given control of the internal ram. Similarly, the address lines may be connected to provide a linear appearance to the XC6216 port. The 486 has address lines A31–A2 and BE#0–BE#3. In order to design the XC6216 to control the system, the controller must develop pins BE#O–BE#3 from the LSB's of the XC6216 Pads SØ, S1. To simplify the controller design, the design requirement may be imposed to read and write thirty-two bit words so that the XC6216 FPGA controls the 486 MP by driving the controller pins BE#O–BE#3 to a logic level of Ø. Certain ports of the XC6216 FPGA must be reserved for the hardware operating system (HOS). The east portion of the XC6216 chip is connected to the main data bus and the north-east corner contains the interface to the controller chip.

TABLE 1

1 Intel 486 pinout identification

| PIN NAMES | TYPE |
|---|---|
| CLK | Control |
| A31-A4 | Parallel |
| A2-A3 | Control |
| BE0-3# | Control |
| D31-D0 | Parallel |
| DP0-3 | Control |
| DCHK# | Control |
| M/IO# | Control |
| D/C# | Control |
| W/R# | Control |
| Lock# | Control |
| Plock# | Control |
| ADS# | Control |
| RDY# | Control |

TABLE 1-continued

1 Intel 486 pinout identification

| PIN NAMES | TYPE |
|---|---|
| BRDY# | Control |
| BLAST# | Control |
| Reset# | Control |
| INTR | Control |
| NMI | Control |
| BREQ | Control |
| Hold | Control |
| Pin names | TYPE |
| HLDA | Control |
| BOFF# | Control |
| AHOLD | Control |
| EADS# | Control |
| KEN# | Control |
| Flush# | Control |
| PWT | Control |
| PCD | Control |
| FERR# | Control |
| IGNNE# | Control |
| B516# | Control |
| B58# | Control |
| A20M# | Control |
| TCK | Control |
| TDI | Control |
| TDO | Control |
| TMS | Control |
| UP# | Control |

1
2 #= active low

What is claimed is:

1. A method for integrating a field programmable gate array (FPGA) resource having a first set of defined input/output (I/O) ports with a data processor having a second set of defined I/O ports within a single module, comprising the steps of:
   identifying I/O ports of the FPGA and processor operable in parallel;
   identifying control ports of the FPGA and processor;
   routing the control ports to a controller;
   establishing a controller-to-FPGA (C:F) interface through the control pins of the FPGA;
   establishing a processor-to-controller (P:C) interface through the control pins of the processor; and,
   logically connecting the C:F and P:C interfaces;
   wherein the step of indentifying I/O ports operable in parallel comprises the steps of:
      identifying non-control, non-power, and non-ground ports of the FPGA and processor,
      determining whether the identified ports are bi-directional,
      determining whether bi-directional, identified ports are tri-stable, and
      routing in parallel bi-directional, tri-stable identified ports.

2. The method of claim 1, wherein the step of identifying I/O ports operable in parallel includes the steps of:
   determining whether non-bi-directional, identified ports are input ports;
   determining whether non-bi-directional, identified, input ports receive signals during operation which force a hardwired change of state of the processor; and,
   routing in parallel non-bi-directional, identified, input ports which are determined not to force a change of state of the processor.

3. The method of claim 1, wherein the step of identifying I/O ports operable in parallel includes the steps of:

determining whether non-bi-directional, identified ports are output ports;

determining whether non-bi-directional, identified, output ports are tri-statable; and routing in parallel non-bi-directional, tri-statable, identified, output ports.

* * * * *